United States Patent [19]
Betts

[11] Patent Number: 6,014,371
[45] Date of Patent: Jan. 11, 2000

[54] ECHO CANCELLATION SYSTEM AND METHOD FOR MULTIPOINT NETWORKS

[75] Inventor: William L. Betts, St. Petersburg, Fla.

[73] Assignee: Paradyne Corporation, Largo, Fla.

[21] Appl. No.: 08/994,867

[22] Filed: Dec. 19, 1997

Related U.S. Application Data

[60] Provisional application No. 60/039,861, Mar. 5, 1997.

[51] Int. Cl.[7] ...................................... H04L 5/14
[52] U.S. Cl. .......................... 370/286; 370/451; 375/222
[58] Field of Search ..................... 370/286, 289, 370/290, 449, 451, 447, 419, 522; 375/222; 379/406, 410, 411

[56] References Cited

U.S. PATENT DOCUMENTS

| | | | |
|---|---|---|---|
| 4,394,767 | 7/1983 | Slum ......................................... | 375/231 |
| 4,481,622 | 11/1984 | Cheng et al. ............................ | 370/286 |
| 4,669,090 | 5/1987 | Betts et al. ................................. | 375/8 |
| 4,750,165 | 6/1988 | Champagne ............................ | 370/276 |
| 4,792,940 | 12/1988 | Hiraguchi ................................ | 370/292 |
| 4,817,114 | 3/1989 | Boer et al. ................................ | 375/222 |
| 5,289,459 | 2/1994 | Brownile .................................. | 370/252 |
| 5,388,092 | 2/1995 | Koyama et al. ......................... | 370/32.1 |
| 5,418,778 | 5/1995 | Cummiskey et al. .................. | 370/32.1 |
| 5,434,849 | 7/1995 | Vicard et al. ........................... | 370/32.1 |
| 5,495,473 | 2/1996 | Cox ......................................... | 370/286 |
| 5,553,014 | 9/1996 | De Leon, II et al. .................. | 708/322 |
| 5,631,923 | 5/1997 | Kaku et al. ............................. | 375/222 |

*Primary Examiner*—Chau Nguyen
*Assistant Examiner*—Ken Vanderpuye
*Attorney, Agent, or Firm*—Thomas, Kayden, Horstemeyer & Risley

[57] ABSTRACT

An improvement to a half duplex multipoint communication environment enables the full duplex communication of information between a control modem and any one of a plurality of remote modems at any given time. This is accomplished by providing a system for echo cancellation in a multipoint communication environment whereby a first modem having a first echo canceler for canceling the echo on a transmission line and a plurality of additional modems each having an echo canceler are connected to the same copper wire pair. The presence of an echo canceler in each modem connected to the transmission path enables the full duplex exchange of information between the control modem and one of the remote modems at any given time.

14 Claims, 4 Drawing Sheets

ECHO CANCELLATION SYSTEM AND METHOD FOR MULTIPOINT NETWORKS

CROSS REFERENCE TO RELATED APPLICATION

This document claims priority to and the benefit of the filing date of copending and commonly assigned provisional application entitled ECHO CANCELLATION FOR MULTIPOINT NETWORKS, assigned Ser. No. 60/039,861, and filed Mar. 5, 1997 and is hereby incorporated by reference.

FIELD OF THE INVENTION

The present invention relates generally to data communications, and more particularly, to a system and method for optimizing the full duplex exchange of information in a multipoint network topology.

BACKGROUND OF THE INVENTION

The field of data communications typically uses a modem to convey information from one location to another. Digital Subscriber Line (DSL) technology now enables modems to communicate rapidly large amounts of data. Modems communicate by modulating a baseband signal carrying digital data, converting the modulated digital data signal to an analog signal, and transmitting the analog signal over a conventional copper wire pair using techniques that are known in the art. These known techniques include mapping the information to be transmitted into a signal space constellation, and various coding and equalization techniques. The constellation can include both analog and digital information or only digital information.

In the above mentioned communications system, both digital data and an analog signal can be transmitted. The data signal to be transmitted is represented by a sequence of data symbols, where each data symbol is associated with a particular N-dimensional signal point value taken from a signal space. Similarly, the analog signal, which is represented by a voice signal, is processed so that it is mapped into the N-dimensional signal space to provide a voice signal point. This voice signal point defines the magnitude and angle of a voice signal vector about the origin of the signal space. The data symbol and the voice vector are then added together to select a resultant N-dimensional signal point. These N-dimensional signal points are grouped into signal space constellations and then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

In the above mentioned communications environment, a control modem is located at a telephone company central office location. Connected to the control modem via a conventional copper wire pair are a plurality of remote modems. The remote modems reside at a common location, such as a residence or a business location. The communication technique between the control modem and the remote modems is generally half duplex. This means that only the control modem or one of the remote modems may transmit at any time. While one modem is transmitting, the other modems, whether the control modem or one of the remote modems cannot transmit. This predicament compromises line efficiency and prevents it from reaching near 100%.

SUMMARY OF THE INVENTION

The present invention provides an improvement to a half duplex multipoint communication environment by enabling the full duplex communication of information between a control modem and any one of a plurality of remote modems at any given time. This is accomplished by providing a system for echo cancellation in a multipoint communication environment which includes a first modem having a first echo canceler for canceling the echo on a transmission line. Also included in a multipoint communications environment are a plurality of additional modems connected to the same copper wire pair. Each one of these additional modems also includes an echo canceler. The presence of an echo canceler in each modem connected to the transmission path enables the full duplex exchange of information between the control modem and one of the remote modems at any given time. While the control modem and any one of the remote modems are engaged in full duplex communication, the other remote modems on the communication channel are excluded from transmitting or receiving. The echo cancelers included in the control modem and the remote modems can be, for example, adaptive finite impulse response (FIR) filters.

The present invention also provides a method for echo cancellation in a multipoint communication environment in a modem. A "clear" signal that can be represented by an additional special marker symbol transmitted in a signal space constellation and which defines a discernible silent period is sent from a control modem to each of a plurality of remote modems. The transmission of special marker symbols is disclosed in copending commonly assigned U.S. patent application Ser. No. 08/979,455, entitled "SYSTEM AND METHOD FOR TRANSMITTING SPECIAL MARKER SYMBOLS" (Attorney Docket No. 61606-1830), filed on Nov. 26, 1997, and incorporated herein by reference. The clear signal indicates that each of the remote modems is to remain silent to await additional commands from the control modem.

When each of the remote modems receives the clear signal, each remains silent and receptive to a command signal from the control modem. At this time the control modem begins sending poll signals to each of the remote modems connected on the communications channel. The poll signal queries each remote modem sequentially in order to determine whether any remote modem has any information to transmit. If any remote modem has information to transmit, it replies by beginning its transmission. Once this transmission begins, because of the echo cancelers present in each modem, the transmission is allowed to occur in full duplex mode, thus enabling the control modem and the remote modem that is transmitting to transmit and receive simultaneously on the communications channel, thus improving line efficiency to near 100%.

The invention has numerous advantages, a few of which are delineated hereafter, as merely examples.

An advantage of the present invention is that it optimizes throughput to near 100%, both upstream and downstream, on a communications channel.

Another advantage of the present invention is that by providing echo cancellation for the control modem, the control modem will always be able to detect the presence of an additional remote modem.

Another advantage of the present invention is the ability to capitalize on the ability to transmit special marker signals, such as "silent" "end of transmission", or "save state" in order to provide a clear signal to a remote modem indicating that a poll signal is awaiting delivery.

Another advantage of the present invention is that the poll signal, which may be terminated by a special marker symbol, can signal all remote modems to store the state of memory devices, such as data randomizers, scramblers, differential decoders and/or trellis decoders. This is disclosed in commonly assigned U.S. Pat. No. 4,669,090. At the beginning of the next poll signal, all remote modems can reload the state of these devices so that they can begin decoding again with no special training or initialization sequence. Randomizers can continue to randomize from poll to poll and avoid initialization which would degrade the statistical properties of the randomizer. The polled remote modem will continue decoding and, at the next poll, will reload the state that was present at the time of the "save state" marker.

Another advantage of the invention is that it optimizes full duplex exchange of information.

Another advantage of the present invention is that it is simple in design, reliable in operation, and its design lends itself to economical mass production in modems.

Other features and advantages of the present invention will become apparent to one with skill in the art upon examination of the following drawings and detailed description. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings. The components within the drawings are not necessarily to scale relative to each other, emphasis instead being placed on clearly illustrating the principles of the present invention.

DETAILED DESCRIPTION OF THE PREFERRED EMBODIMENT

The present invention can be implemented in software, hardware, or a combination thereof. In the preferred embodiment, the elements of the present invention are implemented in software that is stored in a memory and that configures and drives a suitable digital signal processor (DSP) situated in a modem. However, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method.

Figure 1:
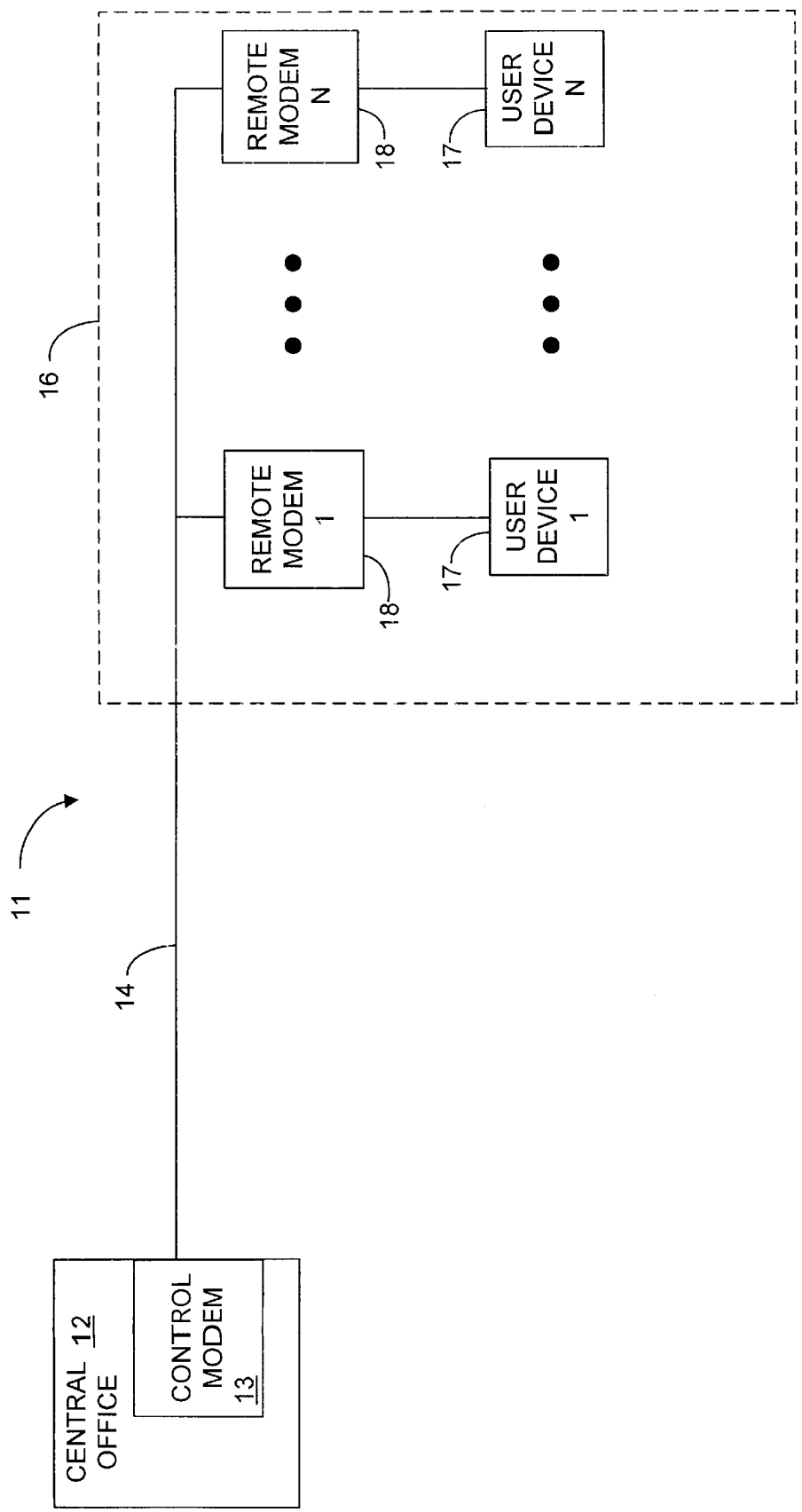
FIG. 1 is a schematic view illustrating a multipoint communications environment.

Referring now to FIG. 1, shown is a schematic view illustrating a multipoint communications environment 11 in which modems employing the concepts and features of the present invention are used. Remote location 16 is connected to central office location 12 via communication channel 14. Located at central office location 12 is control modem 13.

Communication channel 14 is typically the copper wire pair that runs between a telephone company central office and a residential, business, or other remote location. Remote location 16 may contain a plurality of modems 18 connecting a plurality of user devices 17 to channel 14. Remote location 16 can be a residential, business, or any other location served by a conventional copper wire pair. By using modems 18 and modem 13 employing the concepts and features of the present invention, it is possible to simultaneously transmit and receive information between control modem 13 located at central office 12 and any one remote modem 18 located at location 16 in a full duplex mode of operation.

Figure 2:
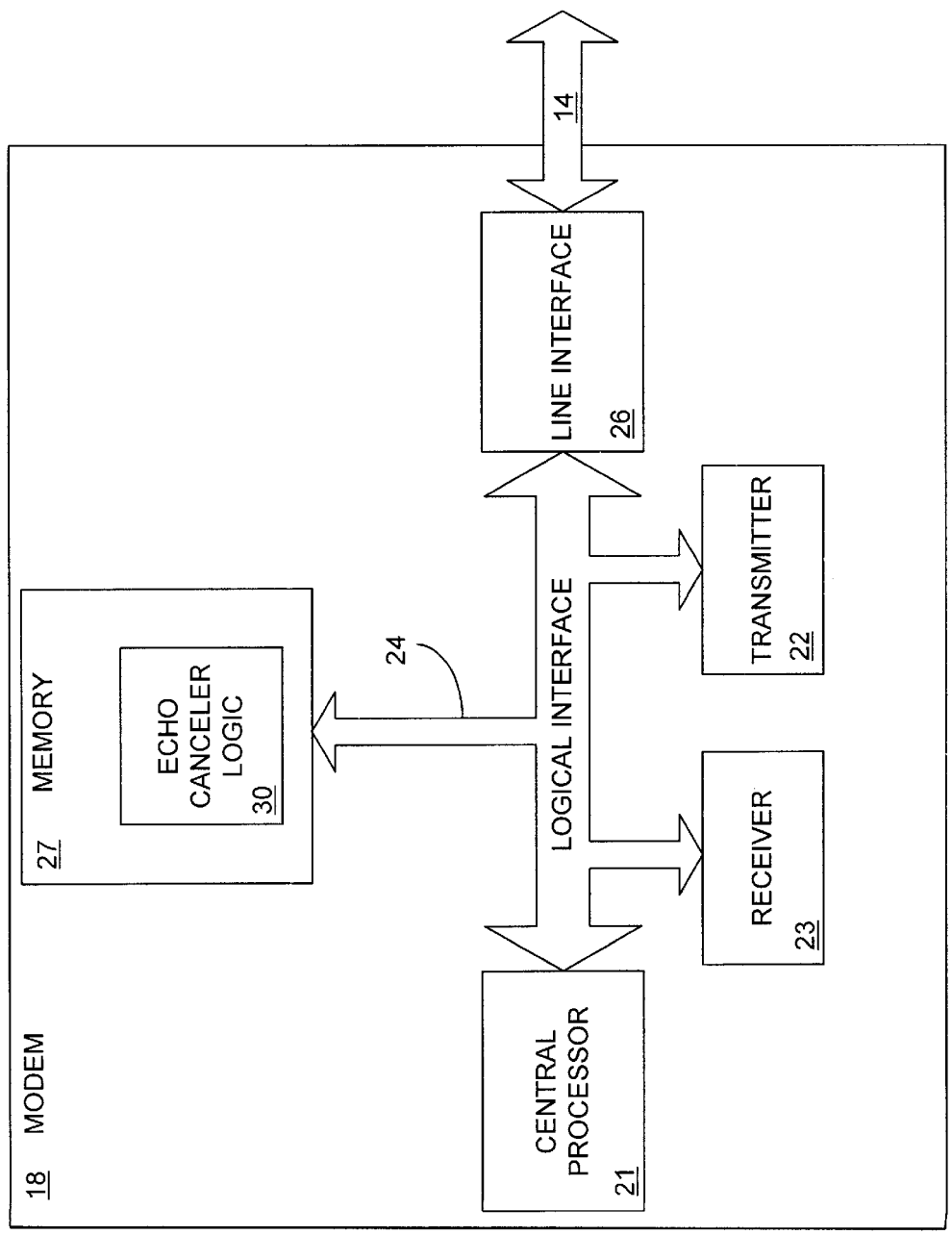
FIG. 2 is a schematic view illustrating a modem of FIG. 1 including the echo canceler logic of the present invention.

Now referring to FIG. 2, shown is a schematic view illustrating modem 18 of FIG. 1 including the concepts of the present invention. The present invention resides in both remote modem 18 and control modem 13, however, for simplicity, only remote modem 18 will be discussed with respect to FIG. 2.

Modem 18 contains conventional components as is known in the art of data communications. Central processor 21 controls the operation of the modems transmitter 22 and receiver 23 through logical interface 24, and couples to line interface 26 to gain access to communication channel 14 . Also included in modem 18 is memory 27 which includes echo canceler logic 30 of the present invention. Echo canceler logic 30 is configured to enable and drive echo canceler 31 (see FIG. 3) in control modem 13 and echo canceler 31 in remote modem 18 to allow simultaneous communication in full duplex mode, thus providing nearly full use of the capacity available on communication channel 14.

Figure 3:
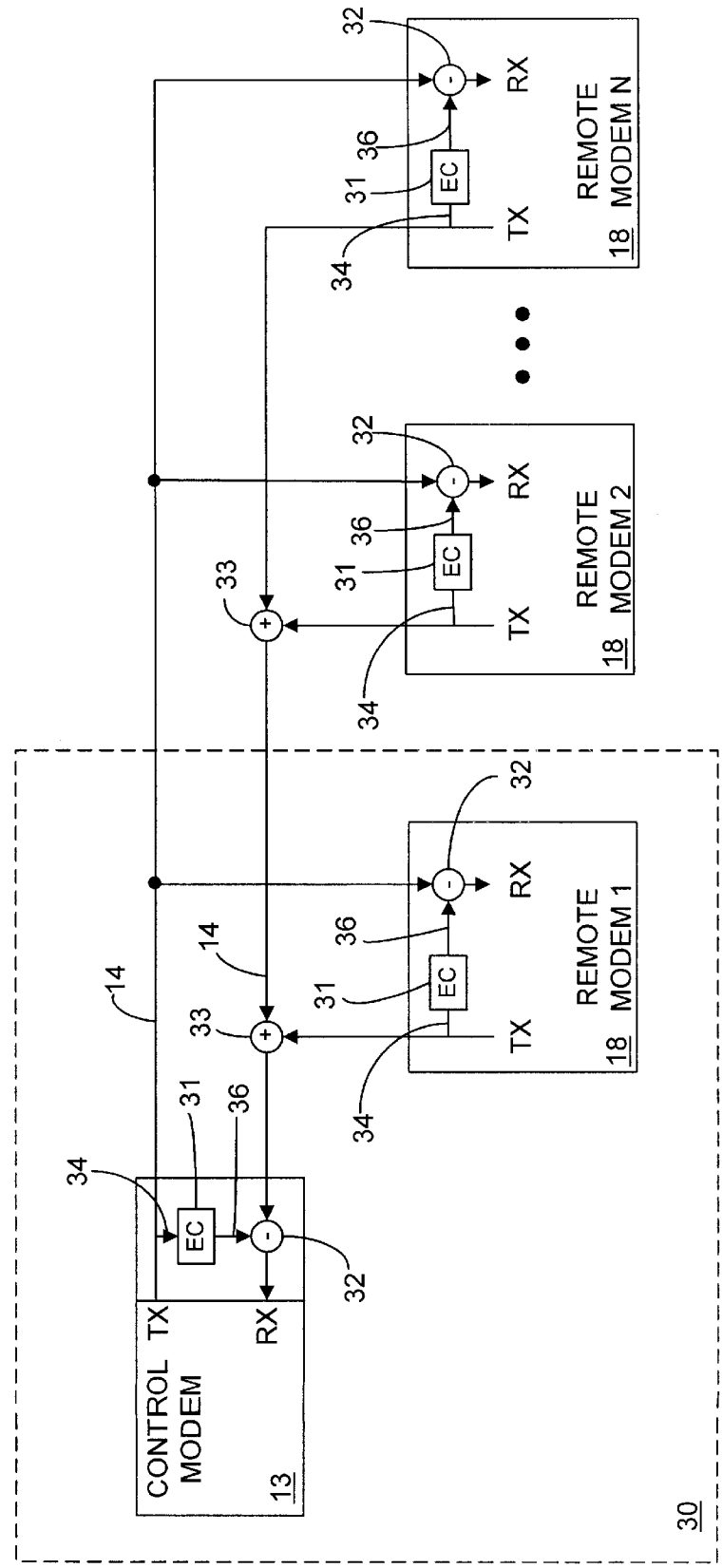
FIG. 3 is a schematic view illustrating a multipoint communications channel including modems constructed in accordance with FIG. 2.

With reference now to FIG. 3, shown is a schematic view illustrating a multipoint communication channel including control modem 13 and remote modems 18, all employing the concepts of the present invention. For simplicity, echo canceler system 30 illustrates an embodiment of the echo cancellation logic 30 referred to in FIG. 3, whereby control modem 13 and one remote modem 18 engage in the full duplex exchange of information. However, any remote modem 18 can engage in the above mentioned full duplex communication mode with control modem 13 by employing the echo cancellation system and method of the present invention. Control modem 13 and remote modems 18 include echo canceler 31 and adder 32. Echo canceler 31 filters the transmit signal on line 34 producing a filtered transmit signal on line 36 that is subtracted by adder 32 from the received signal on communication channel 14. Echo canceler 31 is preferably a finite impulse response (FIR) filter having adaptive coefficients. This enables control modem 13 to simultaneously transmit and receive a communication signal on communication channel 14. For simplicity, communication channel 14 is depicted as two discrete wire pairs, however, in practice communication channel 14 is a single copper wire pair as described above. Similarly, each remote modem 18 includes echo canceler 31 which filters the remote modem's transmit signal, and adder 32 which subtracts that filtered transmit signal from the receive path. Adder 33 in communication channel 14 adds the transmit signal of each remote modem 18 to provide the receive signal to adder 32 of control modem 13. Still referring to FIG. 3, each remote modem 18 contains the above defined echo canceler. When any one remote modem 18 is communicating with control modem 13 in full duplex mode, that is each modem simultaneously transmitting and receiving, all other remote modems 18 on communication channel 14 are prevented from transmitting or receiving.

Figure 4:
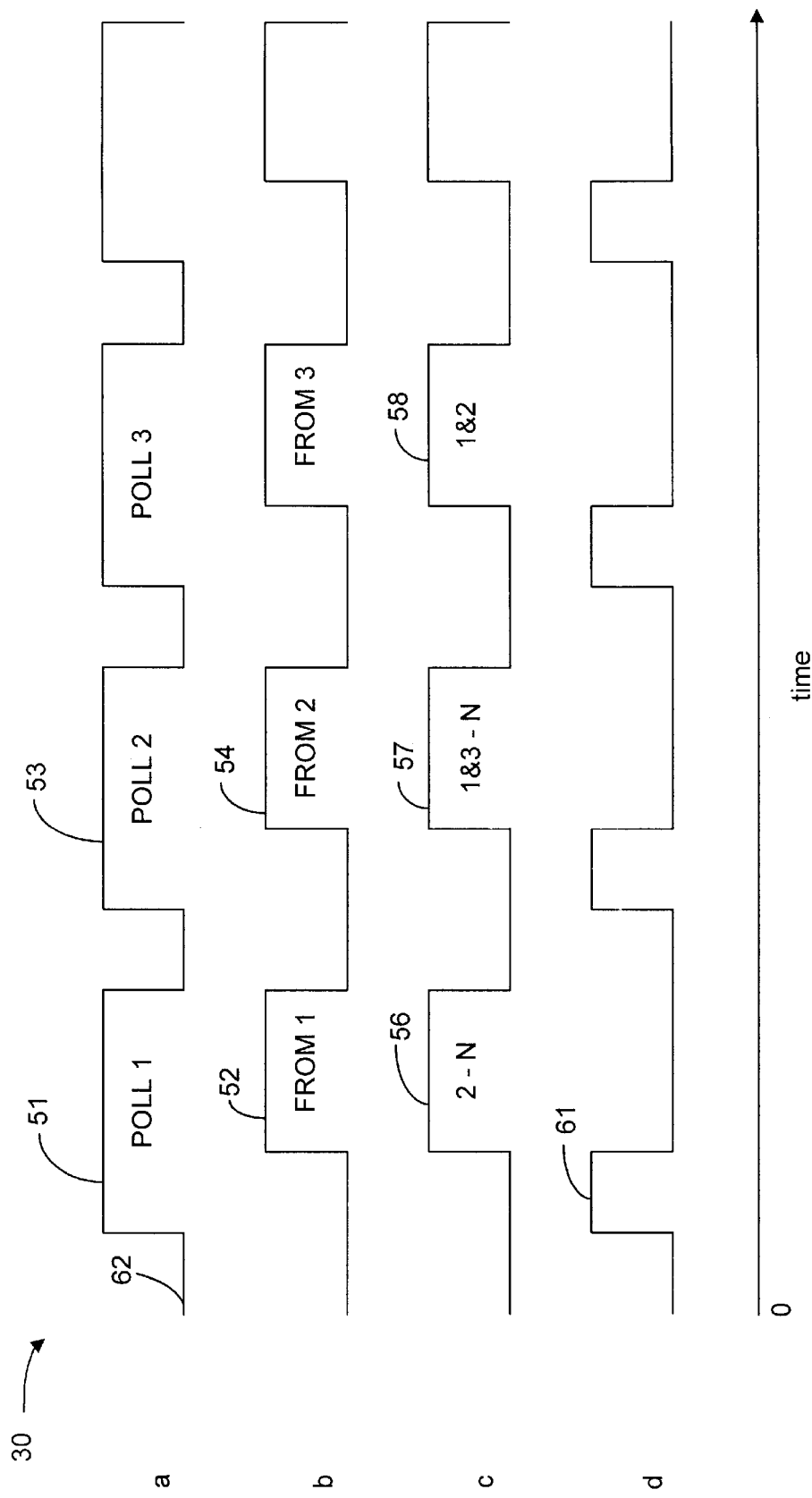
FIG. 4 is a timing diagram illustrating the communication sequence provided by the echo canceler logic of the modems of FIGS. 2 and 3.

Referring now to FIG. 4, shown is a timing diagram illustrating the communication sequence provided by echo canceler logic 30 of control modem 13 and remote modems 18 of FIGS. 2 and 3. Trace "a" illustrates the poll signals outbound from control modem 13 to remote modems 18. Control modem 13 will send poll signal 51 to a first remote modem 18, the poll signal including the address of the first remote modem 18. At the end of the poll phase of the poll signal and prior to transmission by first remote modem 18, control modem 13 will store the state of its encoder memory including the randomizer. Remote modems 18 will likewise store their decoder memories. This ability of each modem to save the state of its memory is disclosed in commonly assigned U.S. Pat. No. 4,669,090. Control modem 13 will continue to transmit outbound data, advancing its encoder memory. The poll signal provides the first remote modem 18 the opportunity to transmit its information. This information transmitted by the first remote modem 18 is represented in trace "b" as signal 52 indicating inbound information from remote modem 18 to control modem 13. This exchange between control modem 13 and first remote modem 18 occurs in a full duplex mode of operation enabled by echo canceler logic 30. While control modem 13 and any remote modem 18 are engaged in this full duplex communication mode, all remaining remote modems 18 are excluded from communication channel 14. Once the first remote modem 18 completes its transmission to control modem 13, control modem 13 is then free to send poll signal 53 to a second remote modem 18, querying whether the second remote modem 18 has any information to transmit. Control modem 13 will reload the encoder memory state prior to sending poll signal 53 and all remote modems 18 will reload their decoder memory state prior to receiving poll signal 53. Special marker symbols, such as the "save state" marker allow all modems to save their states in synchronization. This ability to transmit a special marker symbol, such as the "save state" symbol is described in commonly assigned, copending U.S. patent application Ser. No. 08/979,455, titled "SYSTEM AND METHOD FOR TRANSMITTING SPECIAL MARKER SYMBOLS" (Attorney Docket No. 61606-1830), filed on Nov. 26, 1997. After receiving poll signal 53, if second remote modem 18 has information to transmit, it sends signal 54, of trace "b", to control modem 13 containing its data to be transmitted. In similar fashion to that described with respect to the communication between control modem 13 and a first remote modem 18, the communication between control modem 13 and second remote modem 18 occurs in a full duplex mode of operation. This sequence of operation continues, thus allowing control modem 13 to poll all remote modems 18 connected to communication channel 14 in order to determine whether each remote modem 18 has any information to transmit. This full duplex mode of operation greatly enhances the efficiency of communication channel 14 by permitting virtually 100% channel utilization.

Control modem 13 can save its decoder memory state independently for each remote modem 18 at the end of each reception of a "from" signal from the respective remote modem 18. This can be synchronized by an "end of transmission" special marker symbol.

Trace "c" indicates the interference present when one of the remote modems 18 is communicating with control modem 13 in full duplex mode. For example, signal 56 indicates the interference experienced by all remote modems 18, i.e., remote modems 2 through N, other than a first remote modem, which is in full duplex communication with control modem 13. Signal 57 represents interference experienced by a first remote modem and remote modems 3 through N when a second remote modem is in full duplex communication with control modem 13. Similarly, signal 58 represents the interference experienced by a first and second remote modem when a third remote modem is in communication with control modem 13.

Trace "d" represents clear signal 61 sent by control modem 13 requiring all remote modems 18 to remain silent and await additional commands from control modem 13. This period prevents any remote modem 18 from transmitting and allows all remote modems to be controlled by control modem 13. At the end of clear signal 61, and signaled by, for example, the "save state" special marker symbol, control modem 13 will save its encoder memory and all remote modems 18 will save their decoder memory. At the beginning of clear signal 61 control modem 13 will reload its encoder memory and all remote modems 18 will reload their decoder memory. Thus, control modem 13 and all remote modems 18 remain synchronized. Signal 62 on trace "a" represents a silent interval that is a definite indicator sent by control modem 13 to remote modems 18 instructing the remote modems to await the transmission of a poll signal.

Another aspect of the present invention capitalizes on the ability to transmit special marker symbols such as "End of File", "Start of Message", "Save State" and "End of Transmission". These special marker symbols are signal points added to the signal space constellation, and can be transmitted by control modem 13 to remote modems 18 to, for example, signal the silent period 62 referred to above. By using a special symbol to signal the silent period, there is reduced risk of misinterpreting a period in which no data is transmitted as the silent period. This aspect transmits an extra marker symbol signal having the same signal strength, or margin, as transmitted data, thus increasing the chances of the special symbol being received and recognized.

It will be obvious to those skilled in the art that many modifications and variations may be made to the preferred embodiments of the present invention, as set forth above, without departing substantially from the principles of the present invention. For example, to facilitate detection of a special marker symbol signaling the silent period, control modem 13 may continue to transmit until after remote modem 18 has finished transmission. Thus, control modem 13 is always the first and last to transmit. This would allow special marker symbols as bits to be encoded in the data signal rather than as special marker symbols, however this method adds delay and reduces throughput. Another modification allows control modem 13 to transmit continuously and not send silent period 62, or replace silent period 62 with a known signal that is easily detected and decoded. All such modifications and variations are intended to be included herein within the scope of the present invention, as defined in the claims that follow.

Therefore, the following is claimed:

1. A method for echo cancellation in a multi-point communication environment in a communication device, comprising the steps of:

supplying a clear signal, represented as a defined silent period, from a first communication device to an additional communication device, said first communication device including an echo canceler and said additional communication device including an echo canceler;

receiving in said additional communication device said clear signal, said clear signal directing said additional communication device to remain silent and receptive to a command signal from said first communication device;

supplying a poll signal from said first communication device to said additional communication device, said poll signal inquiring whether said additional communication device has any information to transmit to said first communication device; and receiving in said first communication device said information from said additional communication device, said communication from said additional communication device occurring while said first communication device is transmitting information to said additional communication device in a full duplex mode.

2. The method of claim 1 further comprising an adder located within said first communication device and said additional communication device, said adder configured to subtract a filtered transmit signal from a received signal.

3. The method of claim 1 wherein said additional communication device is co-located with said first communication device.

4. The method of claim 1 wherein said additional communication device is located remotely from said first communication device.

5. The method of claim 1 wherein said echo canceler is a finite impulse response (FIR) filter having adaptive coefficients.

6. The method of claim 1 wherein said echo canceler in said first communication device enables said first communication device to simultaneously transmit and receive a communication signal.

7. The method of claim 1 further comprising an adder located within said additional communication device, said adder configured to subtract a filtered transmit signal from a receive path.

8. A computer readable medium having a program for echo cancellation in a multi-point communication environment in a communication device, the program comprising:

means for supplying a clear signal, represented as a defined silent period, from a first communication device to an additional communication device, said first communication device including an echo canceler and said additional communication device including an echo canceler;

means for receiving in said additional communication device said clear signal, said clear signal directing said additional communication device to remain silent and receptive to a command signal from said first communication device;

means for supplying a poll signal from said first communication device to said additional communication device, said poll signal inquiring whether said additional communication device has any information to transmit to said first communication device; and means for receiving in said first communication device said information from said additional communication device, said communication from said additional communication device occurring while said first communication device is transmitting information to said additional communication device in a full duplex mode.

9. The method of claim 8 further comprising means, located within said first communication device and said additional communication device, for subtracting a filtered transmit signal from a received signal.

10. The method of claim 8 wherein said additional communication device is co-located with said first communication device.

11. The method of claim 8 wherein said additional communication device is located remotely from said first communication device.

12. The method of claim 8 wherein said echo canceler is a finite impulse response (FIR) filter having adaptive coefficients.

13. The method of claim 8 wherein said echo canceler in said first communication device enables said first communication device to simultaneously transmit and receive a communication signal.

14. The method of claim 8 further comprising means, located within said additional communication device, for subtracting a filtered transmit signal from a receive path.

* * * * *

UNITED STATES PATENT AND TRADEMARK OFFICE
CERTIFICATE OF CORRECTION

PATENT NO. : 6,014,371
DATED : January 11, 2000
INVENTOR(S) : Betts

It is certified that error appears in the above-identified patent and that said Letters Patent is hereby corrected as shown below:

Column 8, line 18, delete "method" and substitute therefor --program--.
Column 8, line 22, delete "method" and substitute therefor --program--.
Column 8, line 25, delete "method" and substitute therefor --program--.
Column 8, line 28, delete "method" and substitute therefor --program--.
Column 8, line 31, delete "method" and substitute therefor --program--.
Column 8, line 35, delete "method" and substitute therefor --program--.

Signed and Sealed this

Twenty-eighth Day of November, 2000

Attest:

Q. TODD DICKINSON

*Attesting Officer*    *Director of Patents and Trademarks*